United States Patent [19]

Ferneding

[11] Patent Number: 5,076,386

[45] Date of Patent: Dec. 31, 1991

[54] MOTORIZED BICYCLE

[75] Inventor: Timothy Ferneding, Ft. Lauderdale, Fla.

[73] Assignee: Frank T. Dziewit, Boca Raton, Fla.

[21] Appl. No.: 595,817

[22] Filed: Oct. 10, 1990

[51] Int. Cl.$^5$ .............................................. B62K 11/00
[52] U.S. Cl. .................... 180/205; 180/207; 180/219; 192/94; 280/212
[58] Field of Search .................. 180/205, 207, 219; 280/212, 214; 192/94

[56] References Cited

U.S. PATENT DOCUMENTS

| | | | |
|---|---|---|---|
| 575,639 | 1/1897 | Foye | 180/219 |
| 675,388 | 6/1901 | Keating | 180/219 |
| 682,682 | 9/1901 | Hafelfinger | 180/219 |
| 692,942 | 2/1902 | Strickland | 180/207 |
| 703,769 | 7/1902 | DeLong | 180/207 |
| 764,113 | 7/1904 | Copeland | 180/219 |
| 833,584 | 10/1906 | Cress | 180/219 |
| 965,950 | 8/1910 | Schaeffer | 180/219 |
| 966,303 | 8/1910 | Borlase | 180/219 |
| 2,575,873 | 11/1951 | Henney | 180/205 |
| 3,280,932 | 10/1966 | Moulton | 180/205 |
| 4,393,954 | 7/1983 | Soucy | 180/205 |
| 4,538,713 | 9/1985 | Wasada | 192/94 |
| 4,758,013 | 7/1988 | Agrillo | 192/94 |
| 4,805,470 | 2/1989 | Woodruff | 192/94 |

FOREIGN PATENT DOCUMENTS

| | | | |
|---|---|---|---|
| 848825 | 11/1939 | France | 180/207 |
| 313703 | 4/1956 | Switzerland | 180/207 |
| 907411 | 10/1962 | United Kingdom | 180/205 |

Primary Examiner—Kenneth R. Rice
Attorney, Agent, or Firm—Foley & Lardner

[57] ABSTRACT

A motorized bicycle includes a drive system which can be fitted quickly and easily onto an existing bicycle in such a manner that the bicycle can be pedalled in a free-wheeling mode in which the motorized system does not significantly increase the force needed to pedal the bicycle. The motorized bicycle includes a wheel onto which is mounted a drive gear, a driven gear connected to the drive gear, and a drive device connected to the driven gear. The drive device includes a motor adapted to rotate an output shaft, a rotatable drive shaft, a first drive device detachably connecting the output shaft to the drive shaft, and a second drive device detachably connecting the drive shaft to the driven gear. The second drive device is centrifugally activated via rotation of the drive shaft by the first drive device. The drive system is mounted on a base which can be adjustably mounted on the bicycle's frame.

13 Claims, 3 Drawing Sheets

MOTORIZED BICYCLE

BACKGROUND OF THE INVENTION

1. Field of the Invention

This invention relates to a motorized bicycle and, more particularly, relates to a motorized bicycle which has driving power which can be supplied by pedalling only, motor operation only, or a combination of pedalling and motor operation.

2. Prior Art

Motorized bicycles have been designed which include a drive gear driven by either an engine or pedals. Early designs typically included chain or gear mechanisms which were driven by a motor and which were in constant contact with the bicycle's drive sprocket and with the pedals. While these motorized driving mechanisms did provide a means of supplying auxiliary power to a bicycle, they suffered from several disadvantages. For example, the motor and its drive system were typically in direct communication with the pedals at all times, requiring the bicyclist to drive the motor when pedalling. The drag of the motor significantly increased the force needed to pedal the bicycle. Moreover, the drive systems of these early motorized bicycles were extremely difficult to retrofit onto existing bicycles because they required complicated driving arrangements which necessitated extensive modifications of the bicycles onto which they were mounted. As a consequence, these systems could not be used on multi-speed bicycles.

U.S. Pat. No. 2,575,873 to Henney discloses a motorized bicycle which was designed to avoid some of the above-mentioned drawbacks. Henney's bicycle can be powered by pedalling only, by motor operation only, or by a combination of pedalling and motor operation. Henney also discloses the use of a clutch which allows the motor drive unit to be disengaged mechanically from the rear wheel. Once the motor unit is disengaged, the bicycle can be pedalled without the added resistance of the motor drive elements. For example, if the rider desires some light exercise, he can put the clutch in neutral and pedal the bike as if it were non-motorized. While Henney is desirable from this viewpoint, it also has several disadvantages.

First, the location of the motor on the rear wheel as disclosed by Henney results in an unbalanced bicycle because the center of gravity is moved to the rear and because the motor is mounted on one side of the wheel, giving the bike a tendency to fall over to one side. Also, Henney's device is uneconomical to retrofit on existing bicycles, due to the fact that the entire rear wheel of an existing bicycle must be removed and discarded and replaced with the wheel, motor, and transmission assembly disclosed in Henney. If the existing bike is a multi-speed type of say 3, 10, or 15 speeds, then all the gearing associated with the rear wheel will have to be removed and discarded and a special rear wheel installed, which allows only two speeds. Today, multi-speed bicycles are predominant, and the advantage of the multi-speed gearing is lost in a design such as Henney.

U.S. Pat. No. 3,280,932 to Moulton discloses a power-assisted bicycle capable of being pedalled only, powered only, or both pedalled and powered. Through the use of separate chain drives and separate free wheel sprockets on the rear wheel, the Moulton design also allows the bicycle to be pedalled in a free-wheeling mode without the added resistance of the motor drive elements. Moulton is disadvantageous, however, because it requires a separate drive chain and drive gear mounted on the rear wheel, thereby increasing the weight and cost of the system and making it harder to retrofit the same onto existing bicycles. Moreover, even in the free-wheeling mode, the bicycle is noticeably harder to pedal because the pedals must drive the extra gear on the rear wheel, the second drive chain, and the drive gear for the second drive chain.

SUMMARY OF THE INVENTION

It is therefore an object of this invention to provide a motorized drive system which can be fitted quickly and easily onto an existing bicycle in such a manner that the bicycle can be pedalled in a free-wheeling mode in which the motorized system does not significantly increase the force needed to pedal the bicycle.

In accordance with one aspect of the invention, the drive system includes a motor adapted to rotate an output shaft, a rotatable drive shaft, and a first drive device detachably connecting the output shaft to the drive shaft. In addition, a second drive device is provided which detachably connects the drive shaft to a driven gear. The second drive device is automatically activated via torque provided by rotation of the drive shaft by the first drive device.

In accordance with another aspect of the invention, the second drive device comprises a torque actuated engagement/disengagement device which slides axially on a first end of the drive shaft and a drive gear which slides with the engagement/disengagement device to selectively connect the drive shaft to the driven gear.

Another object of the invention is to provide a motorized bicycle having a drive system which can be fitted quickly and easily onto an existing bicycle in such a manner that the bicycle can be pedalled in a free-wheeling mode in which the motorized system does not significantly increase the force needed to pedal the bicycle.

In accordance with a first aspect of the invention, the motorized bicycle includes a wheel having a drive gear mounted thereon, a driven gear connected to the drive gear, and a drive device connected to the driven gear. The drive device includes a motor adapted to rotate an output shaft, a rotatable drive shaft, a first drive device detachably connecting the output shaft to the drive shaft, and a second drive device detachably connecting the drive shaft to the driven gear. The second drive device is activated via torque resulting from rotation of the drive shaft by the first drive device.

In accordance with another aspect of the invention, the bicycle further includes a base member onto which the drive system is mounted, and means for adjustably mounting the base member onto the bicycle. The adjustable mounting means preferably comprises U-bolts extending from elongated slots in the opposite ends of the base members and blocks which cooperate with the U-bolts to attach the base member to the down pipe and the seat post pipe, respectively.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may

DETAILED DESCRIPTION OF THE PREFERRED EMBODIMENTS

Figure 1:
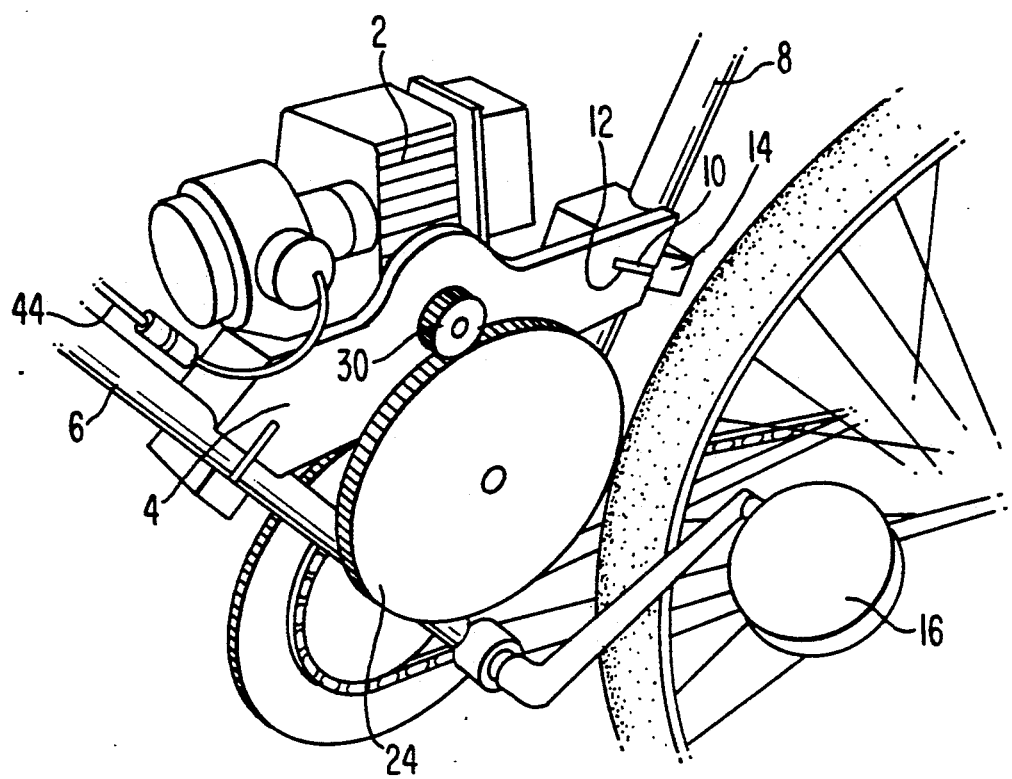
FIG. 1 is a perspective view of the motorized drive system retrofitted on an existing bicycle in accordance with the present invention.

Referring to the drawings, and initially, FIG. 1, a motor 2 is mounted on a base 4 between a down pipe 6 and a seat post pipe 8, on an existing bicycle having any number of speeds. U-bolts 10, slideably disposed in slots 12, cooperate with blocks 14 to mount the base 4 on down pipe 6 and seat post pipe 8. By replacing the blocks 14 with blocks of other thicknesses, the U-bolts can be adjusted to permit mounting the drive system on a variety of different-sized bicycles. An extremely well-balanced system is obtained by centrally mounting the drive system directly above the pedals 16 in this manner.

Figure 2:
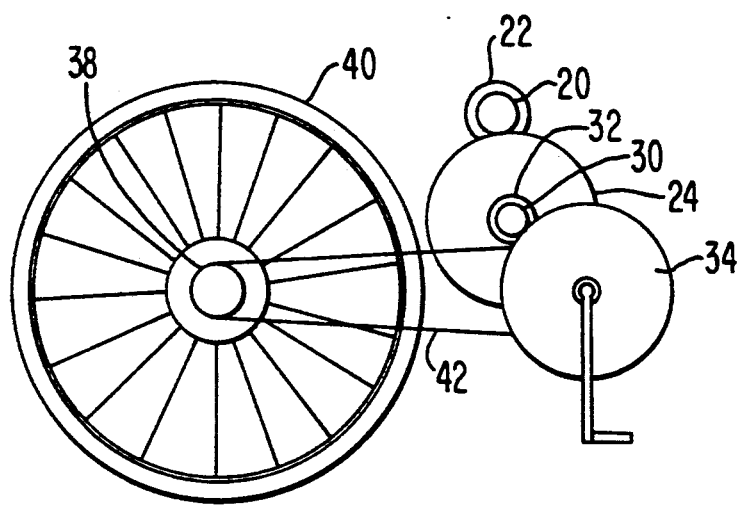
FIG. 2 is a schematic illustration of a portion of a side view of the drive system of FIG. 1.
Figure 3:
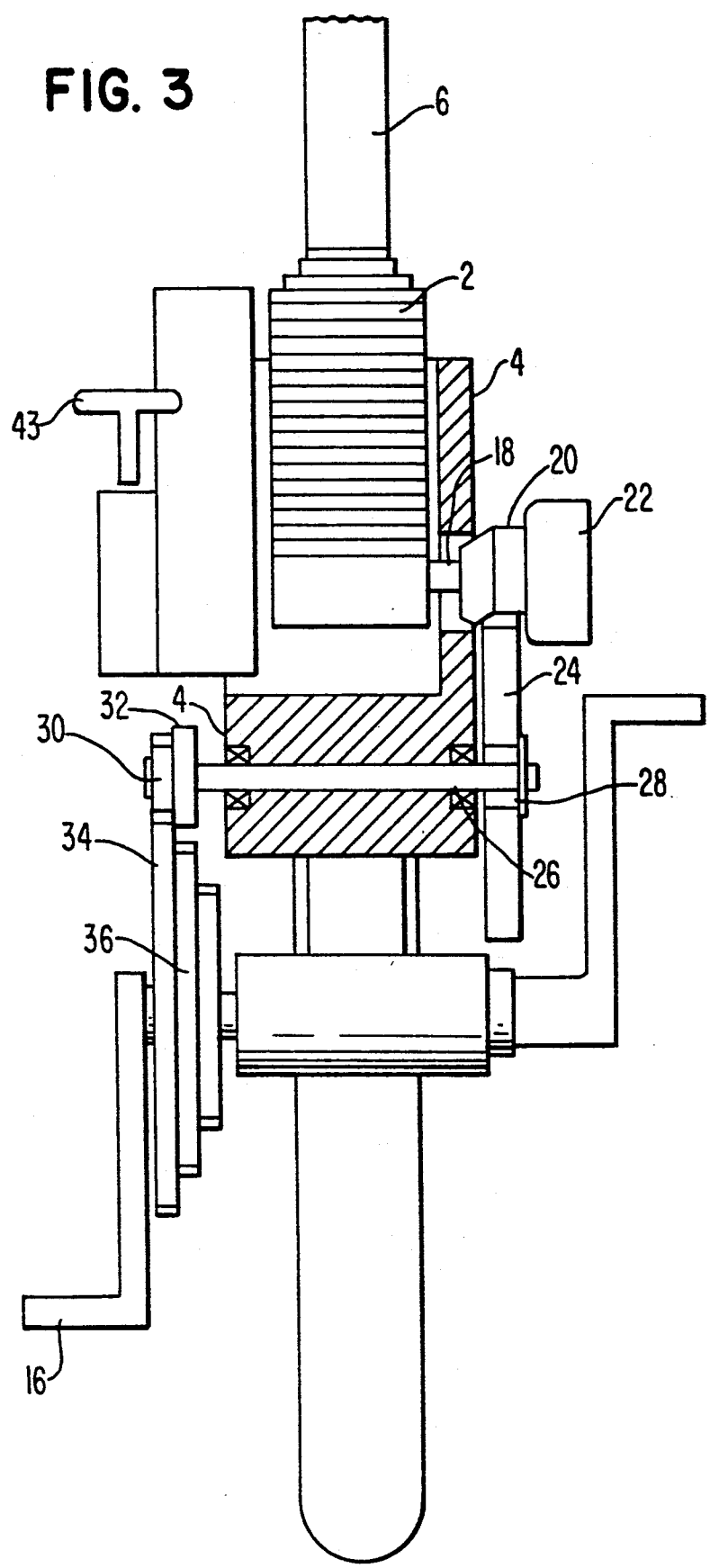
FIG. 3 is a schematic front view of the drive system of FIG. 1, illustrating the drive system in a first operational mode.
Figure 4:
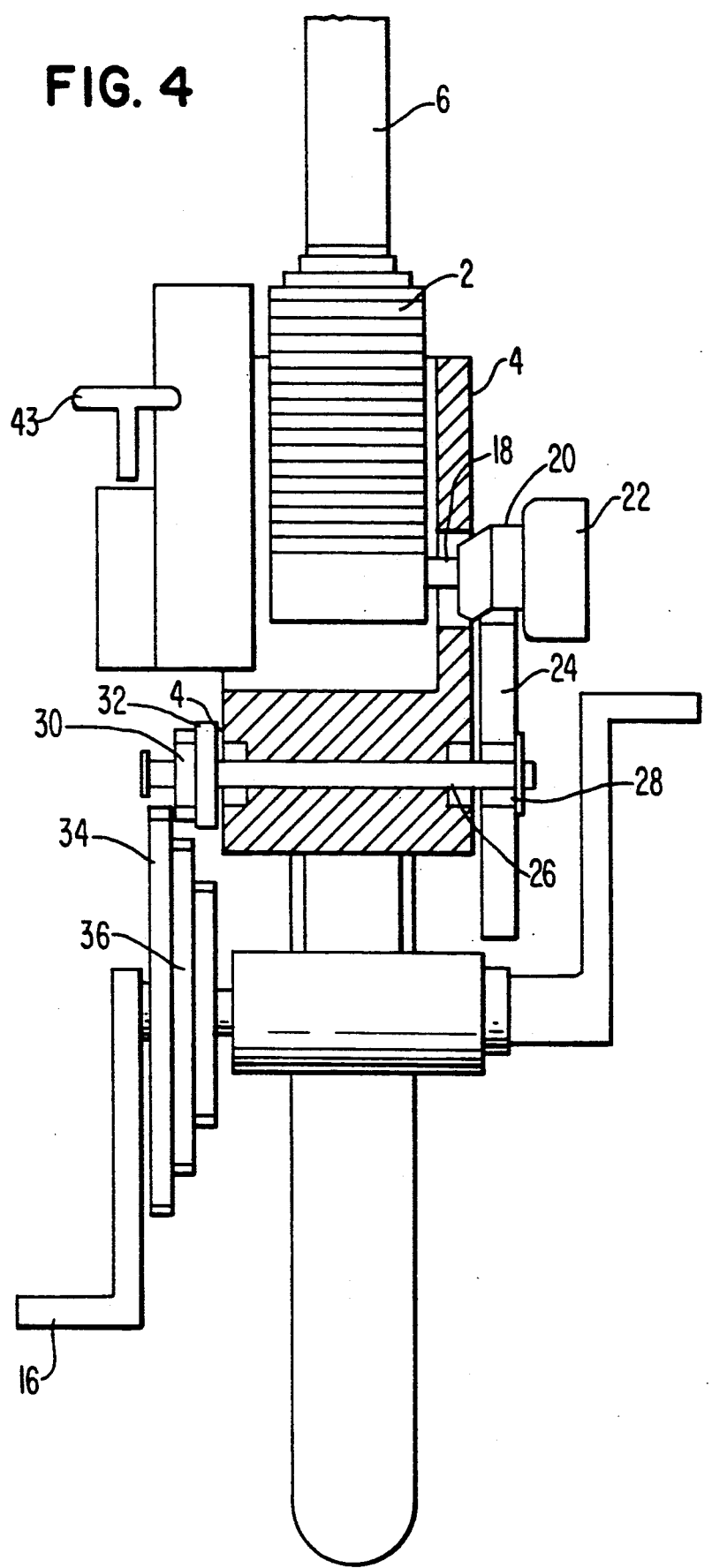
FIG. 4 is a schematic front view of the drive system of FIG. 1 illustrating the drive system in a second operational mode.

Referring to FIGS. 2–4, the drive system of the bicycle preferably consists of output shaft 18 of the motor 2, onto which is mounted a pinion gear 20 controlled by a centrifugal clutch 22. The pinion gear 20 meshes with a first driven gear 24 mounted on a drive shaft 26 which is rotatably supported by bearings 28. There is mounted on the end of the drive shaft 26 opposite driven gear 24 a drive gear 30 and an inertial type engagement/disengagement mechanism 32 which rotate with the drive shaft 26. A second driven gear 34 is rigidly attached, e.g. by bolts, to the existing chain driven sprocket assembly 36 which is connected in a conventional manner to a drive gear 38 of a rear wheel 40 of the bicycle via a chain 42. The sprocket assembly includes a conventional ratchet mechanism which permits the pedals to apply a driving force to chain 42 while allowing the sprocket mechanism to rotate without turning the pedals. This ratchet mechanism is common to most modern bicycles, and assures that the pedals do not turn unless they are powered by the rider.

The motor 2 is preferably a small internal combustion engine which may be started by a pull rope 43 or by any other conventional starter, such as an electric starter. The engine speed is controlled by a suitable device such as a twist-type handlebar throttle control (not shown) connected by a cable 44 to the engine carburetor in a conventional manner. This is the type of throttle control system commonly found on motorcycles, and no further description is believed to be necessary.

The inertial type engagement/disengagement mechanism 32 of the preferred embodiment uses the acceleration or torque of the drive shaft 26, acting on the inertia of the drive gear 30, to create a torque force which drives the drive gear 30 up a helix on the drive shaft 26 and hence into mesh with the second driven gear 36. When the drive shaft 26 is decelerated down to idle speed, the drive gear 30 is driven back down the helix and out of mesh with the second driven gear 34. Mechanisms of this type are commonly used on automobile engine starters. The drive device used in the preferred embodiment is a Bendix ® drive. Such drives are per se, well known, and require no further description.

One of the greatest advantages of the drive system of the present invention is that it can be retrofitted on any speed bicycle without losing the original multi-gear capability of the bicycle. This is because the driven gear 34, which is fixed to the existing chain driven sprocket assembly 36, is the only connection between the motorized unit and the original bicycle drive train. Therefore, the bicycle retains its original gearing whether it has 1, 3, 12, 15 or whatever speeds. In addition, this drive device can be easily retrofitted onto a bicycle due to the fact that its installation requires only a minimum disassembly of the original bicycle.

In operation, the retrofitted motorized bicycle constructed in accordance with the present invention operates in three modes. In the first mode, the motor 2 is started by pulling cord 43 and left idling. The rider mounts the bicycle and begins pedalling. If no power assist is needed, the rider simply pedals the bike in a normal fashion. In this mode of operation, the shaft 26 is rotating at a relatively low speed, and does not generate enough torque to actuate mechanism 32, which assumes the position illustrated in FIG. 4. The rider in this mode pedals the bicycle to power the bicycle in a conventional manner. Because essentially none of the motor drive assembly is connected to the pedals, this pedalling operation encounters very little added resistance to a normal pedalling operation.

If the rider desires power assistance, the handlegrip twist throttle is turned. The motor speed increases, causing the output shaft 18 to accelerate which actuates centrifugal clutch 22 to force pinion 20 to engage with and drive the first driven gear 24, which in turn drives the shaft 26. As the drive shaft 26 accelerates, the inertial mechanism 32 forces the drive gear 30 to mesh with the second driven gear 34, which causes the chain sprocket assembly 36 to turn, which drives the rear wheel. The ratchet mechanism of the sprocket assembly prevents the pedals from turning unless the rider desires to pedal the bicycle. The rider may thus continue to pedal along with power assist from the motor, or he may cease pedalling and proceed under power alone. The former feature allows the bicycle to be used for light exercise, e.g. it allows the rider to use the motor to assist in the driving force while applying the remaining driving force via the pedals.

When it is desired to cease power-assisted operation, the handle-grip throttle is released, the output shaft 18 decelerates to idle speed, the centrifugal clutch 22 disengages the pinion 20 from the first driven gear 24, the drive shaft 26 decelerates, and the drive gear 30 is forced back down the helix on the drive shaft by the mechanism 32 to assume the position illustrated in FIG. 3. In this manner, the second driven gear 34 is disengaged and the bike is ready for pedalling-only operation.

I claim:

1. A drive system for a motorized bicycle having a driven wheel, comprising:
   an output shaft;
   motor means for rotating said output shaft;
   a rotatable drive shaft;
   first drive means for detachably connecting said output shaft to said drive shaft;

a driven gear connected to said driven wheel of said bicycle; and second drive means for detachably connecting said drive shaft to said driven gear, said second drive means being automatically activated via torque resulting from the rotation of said drive shaft to connect said drive shaft to said driven gear, said second drive means automatically disconnecting said driven gear and said drive shaft upon a reduction of torque of said drive shaft.

2. The system of claim 1, wherein said second drive means comprises a torque actuated engagement/disengagement device which slides axially on a first end of said drive shaft and a driv: gear which slides with said engagement/disengagement device to automatically connect said drive shaft to said driven gear upon rotation of said drive shaft.

3. The system of claim 2, wherein said driven gear is mounted on said bicycle coaxially with a sprocket mechanism.

4. The system of claim 3, further comprising another drive gear mounted on a rear wheel of said bicycle and a chain connecting said driven gear to said another drive gear.

5. The system of claim 2, wherein said first drive means comprises a centrifugal clutch and a pinion gear rotatably mounted on said output shaft.

6. The system of claim 1, wherein said motor means comprises an internal combustion engine.

7. A drive system for a motorized bicycle having a driven wheel, comprising:
an output shaft;
a motor adapted to rotate said output shaft;
a rotatable drive shaft;
a first drive device detachably connecting said output shaft to said drive shaft;
a pedal;
a chain sprocket assembly which is connected to said pedal and to said driven wheel of said bicycle and which is arranged coaxial with said pedal;
a driven gear arranged coaxial with said chain sprocket assembly and connected to said chain sprocket assembly; and
a second drive device disposed on said drive shaft and detachably connecting said drive shaft to said drive gear, said second drive device being automatically activated via torque resulting from rotation of said drive shaft to connect said drive shaft to said driven gear, said second drive device automatically disconnecting said driven gear and said drive shaft upon a torque reduction of said drive shaft.

8. The system of claim 7, wherein said second drive device comprises a torque actuated engagement/disengagement device which slides axially on a first end of said drive shaft and a drive gear which slides with said engagement/displacement device to selectively connect said drive shaft to said driven gear upon rotation of said drive shaft.

9. The system of claim 8, further comprising another drive gear mounted on a rear wheel of said bicycle and a chain connecting said driven gear to said another drive gear.

10. The system of claim 8, wherein said first drive device comprises a centrifugal clutch and a pinion gear rotatably mounted on said output shaft.

11. The system of claim 10, wherein said first drive device further comprises a second driven gear adapted to connect said pinion gear to a second end of said drive shaft opposite said first end.

12. A motorized bicycle, comprising:
a wheel having a drive gear mounted thereon;
a pedal;
a sprocket mechanism arranged coaxially with said pedal;
a driven gear connected to said drive gear and mounted on said bicycle coaxially with said sprocket mechanism;
a drive device connected to said driven gear, said drive device comprising:
an output shaft,
a motor adapted to rotate said output shaft;
a rotatable drive shaft,
a first drive device detachably connecting said output shaft to said drive shaft, said first drive device comprising a centrifugal clutch and a pinion gear rotatably mounted on said output shaft in contact with said centrifugal clutch, and
a second drive device detachably connecting said drive shaft to said driven gear, said second drive device being automatically activated via torque resulting from the rotation of said drive shaft to connect said drive shaft to said driven gear, said second drive device comprising a torque actuated engagement/disengagement device which slides axially on a first end of said drive shaft and a drive gear which slides with said engagement/disengagement device to selectively connect said drive shaft to said driven gear upon rotation of said drive shaft;
a base member onto which said drive system is mounted;
a down pipe;
a seat post pipe located adjacent opposite longitudinal ends of said base member;
U-bolts extending from elongated slots in said opposite ends of said base member; and
blocks which cooperate with said U-bolts to attach said base member to said down pipe and said seat post pipe, respectively.

13. The motorized bicycle of claim 12, wherein said first drive device further comprises a second driven gear adapted to connect said pinion gear to a second end of said drive shaft opposite said first end.

* * * * *